(12) United States Patent
Chen

(10) Patent No.: US 12,537,148 B2
(45) Date of Patent: Jan. 27, 2026

(54) BUTTON

(71) Applicant: DARWIN PRECISIONS CORPORATION, Hsinchu County (TW)

(72) Inventor: Hsing-Yu Chen, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 309 days.

(21) Appl. No.: 18/376,446

(22) Filed: Oct. 4, 2023

(65) Prior Publication Data

US 2024/0347289 A1  Oct. 17, 2024

(30) Foreign Application Priority Data

Apr. 14, 2023 (TW) .................... 112113950

(51) Int. Cl.
*H01H 13/14* (2006.01)
*G02B 30/27* (2020.01)
*H01H 13/02* (2006.01)

(52) U.S. Cl.
CPC ............. *H01H 13/14* (2013.01); *G02B 30/27* (2020.01); *H01H 13/023* (2013.01); *H01H 2219/058* (2013.01); *H01H 2219/066* (2013.01); *H01H 2239/022* (2013.01)

(58) Field of Classification Search
CPC ............... H01H 13/14; H01H 13/023; H01H 2219/058; H01H 2219/066; H01H 2239/022; H01H 2219/0026; H01H 2219/018; H01H 13/83; H01H 13/04; G02B 30/27

See application file for complete search history.

(56) References Cited

U.S. PATENT DOCUMENTS

2012/0200475 A1* 8/2012 Baker ................... H01H 9/181
                                                                    345/4

FOREIGN PATENT DOCUMENTS

| CN | 112202438 A | 1/2021 |
|---|---|---|
| CN | 212278211 U | 1/2021 |
| JP | 2022087993 A | 6/2022 |
| JP | 2022129473 A | 9/2022 |
| JP | 2023002330 A | 1/2023 |
| TW | I316201 B | 10/2009 |

* cited by examiner

*Primary Examiner* — Charles S Chang

(57) ABSTRACT

A button includes a substrate, a frame body, an optical pressure board assembly and an optical trigger switch. The substrate includes a physical key and a light emitting assembly. The frame body mounted on the substrate accommodates the physical key and the light emitting assembly. A side of the frame body away from the substrate includes an opening. The optical pressure board assembly is slidably arranged in the frame body and covers the physical key and the light emitting assembly. The optical pressure board assembly is adapted to moving in an operating direction towards the substrate to contact the physical key, so the physical key generates a first manipulation signal. The optical pressure board assembly is further adapted to converting a light beam into a three-dimensional optical image. The optical trigger switch is mounted on an outer side of the frame body and adapted to generating a second manipulation signal.

7 Claims, 7 Drawing Sheets

BUTTON

FIELD OF THE INVENTION

The present invention relates to a button, and particularly relates to a button capable of generating an optical three-dimensional pattern.

BACKGROUND OF THE INVENTION

Buttons are very common input devices nowadays. Known buttons can be mainly divided into two categories: conventional contact press type buttons, wherein physical keys inside the buttons are conducted to generate signals after pressed by a user; and non-contact buttons which generate signals by inducing illumination change caused in fingers of a user in a space in front of an infrared induction device through infrared equipment. Due to hygiene demand, the demand on the non-contact buttons is improved greatly on the market.

At present, the non-contact buttons capable of displaying three-dimensional images are free of physical keys and are based on infrared induction by infrared sensors (IR Sensor). In a case when the infrared sensors decline in function, fail or are abnormal, no physical keys are available for alternative. In terms of design, since an image module for generating the three-dimensional image and a cover plate protecting the image module are fixed parts clamped to the buttons, they cannot be used as the physical keys.

SUMMARY OF THE INVENTION

The present invention provides a button which can serve as a non-contact button capable of generating a three-dimensional optical image. In a case when the induction function of the non-contact button declines, fails or is abnormal, the button can be used as a physical key.

To gain the above advantage, an embodiment of the present invention provides a button including a substrate, a frame body, an optical pressure board assembly and an optical trigger switch. The substrate includes a physical key and a light emitting assembly. The frame body is mounted on the substrate and accommodates the physical key and the light emitting assembly, wherein a side of the frame body away from the substrate includes an opening. The optical pressure board assembly is slidably arranged in the frame body and covers the physical key and the light emitting assembly. The optical pressure board assembly is adapted to moving along an operating direction towards the substrate from the opening to contact the physical key, so that the physical key generates a first manipulation signal. The optical pressure board assembly is further adapted to converting a light beam provided by the light emitting assembly into a three-dimensional optical image projected from the opening. The optical trigger switch is mounted on an outer side of the frame body and is adapted to generating a second manipulation signal while sensing the three-dimensional optical image.

In an embodiment of the present invention, the optical pressure board assembly includes a pressure board and an optical imaging component. A periphery of the pressure board includes a guide piece. The guide piece includes a sliding plate portion and a bulge portion, wherein the sliding plate portion is slidably connected to an inner wall surface of the frame body, and the bulge portion protrudes out of a surface of the sliding plate portion and is adapted to being slidably arranged in a sliding groove in the inner wall surface. The optical imaging component is connected to the pressure board and located on a side of the pressure board facing the substrate.

In an embodiment of the present invention, the optical imaging component includes an imaging unit and a lens array. The imaging unit faces the substrate and includes a preset pattern. The lens array is configured on a side of the imaging unit away from the substrate, wherein the light beam passes through the imaging unit and the lens array to form the three-dimensional optical image.

In an embodiment of the present invention, the optical imaging component further includes a collimating unit. The collimating unit is configured between the substrate and the imaging unit and is adapted to converting the light beam into a parallel light beam.

In an embodiment of the present invention, the button further includes a middle frame. The middle frame is connected between the optical imaging component and the substrate and includes a body and an elastic arm connected to the body, wherein the body is adapted to contacting with the physical key after being pushed against. The elastic arm is connected to the substrate and is adapted to generating a gap between the body and the substrate.

In an embodiment of the present invention, the physical key is a tactile switch and is adapted to providing the optical pressure board assembly with a restoring acting force when the optical pressure board assembly is pressed.

In an embodiment of the present invention, the frame body includes an arrangement groove, wherein the arrangement groove is formed in a side of the opening. A notch of the arrangement groove inclines to the operating direction and faces the opening, and the optical trigger switch is arranged in the arrangement groove.

By virtue of the above description, since the optical trigger switch, the physical key and the movable optical pressure board assembly are arranged in the button, the button can also be used to generate manipulation signals by way of pressing the physical key by the optical pressure board assembly while the button is used as the non-physical key capable of generating the three-dimensional optical image through the optical trigger switch and the optical pressure board assembly. Therefore, when the optical trigger switch declines in function, fails or is abnormal, the button can also be used as the contact button.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

Figure 1:
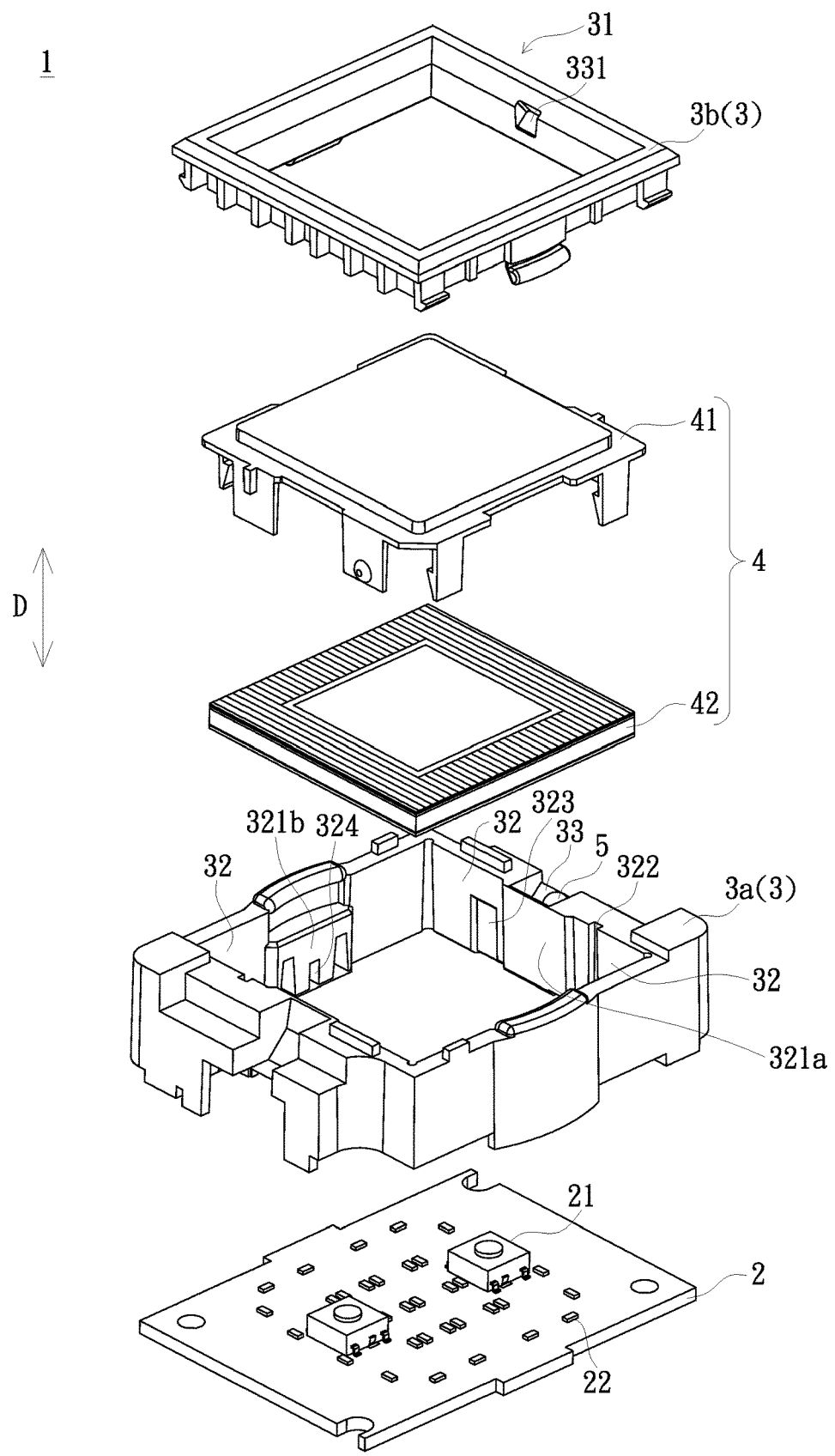
FIG. 1 is an exploded schematic diagram of a button in an embodiment of the present invention.

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Terms used in the description of the embodiments of the present invention, for example, orientation or position relation such as "above" and "below" are described according to the orientation or position relation shown in the drawings. The above terms are used for facilitating description of the present invention rather than limiting the present invention, i.e., indicating or implying that the mentioned elements have to have specific orientations and to be configured in the specific orientations. In addition, terms such as "first" and "second" involved in the description or claims are merely used for naming the elements or distinguishing different embodiments or ranges rather than limiting the upper limit or lower limit of the quantity of the elements.

Figure 2:
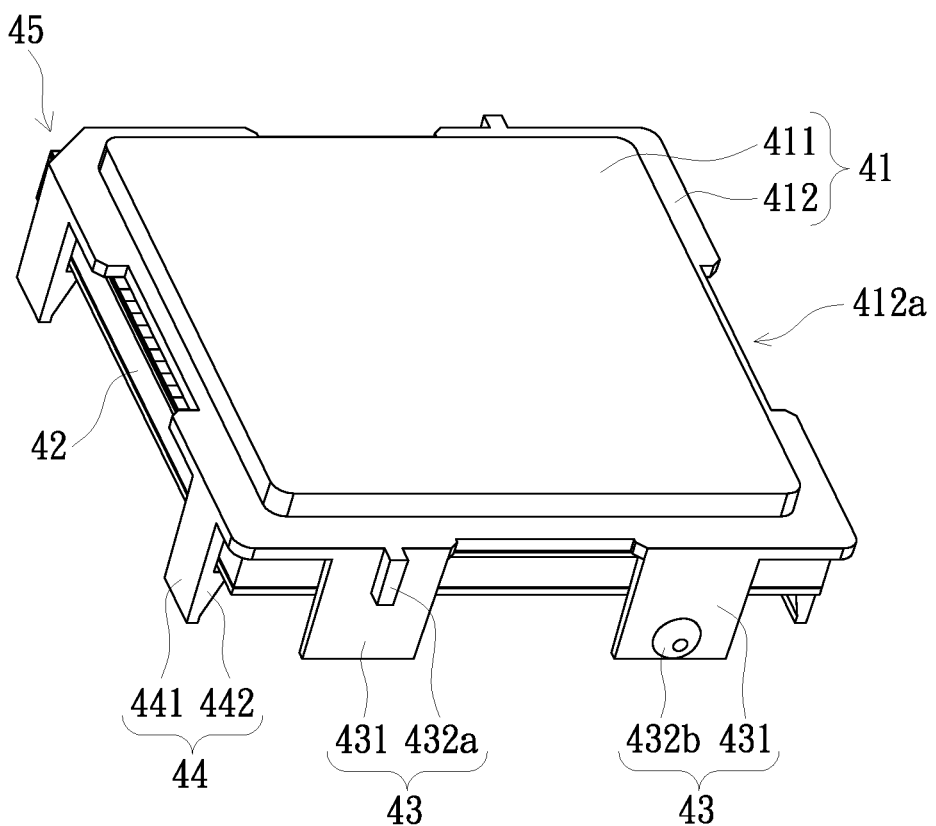
FIG. 2 is a three-dimensional schematic diagram of an optical pressure board assembly in FIG. 1.
Figure 3A:
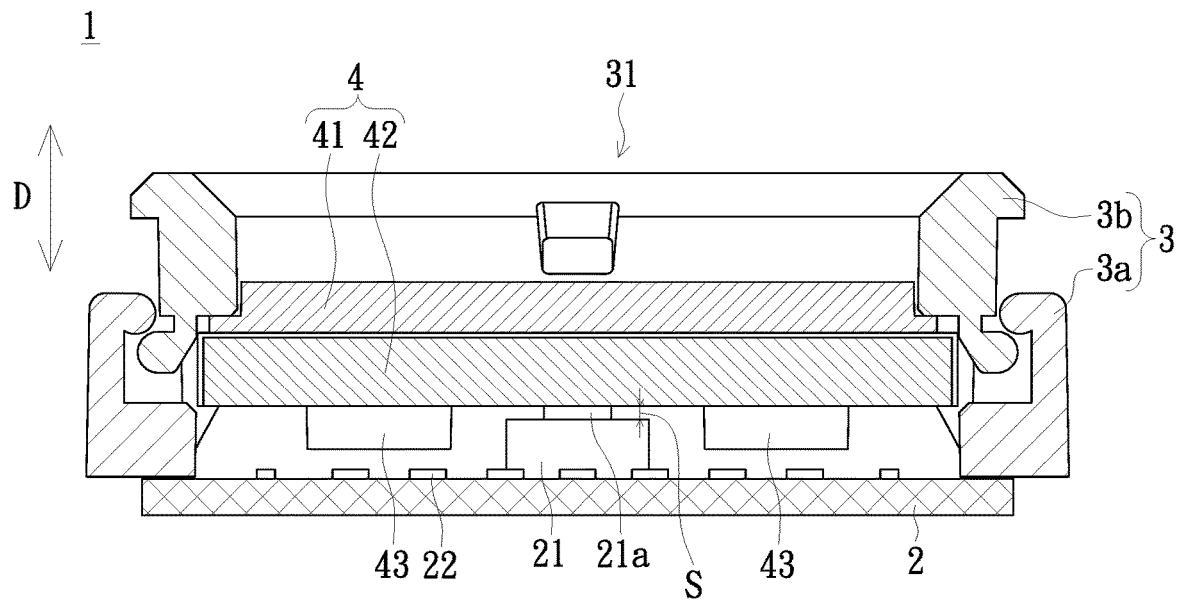
FIG. 3A is a partial schematic cross-sectional view of an unactuated physical key in FIG. 1.
Figure 3B:
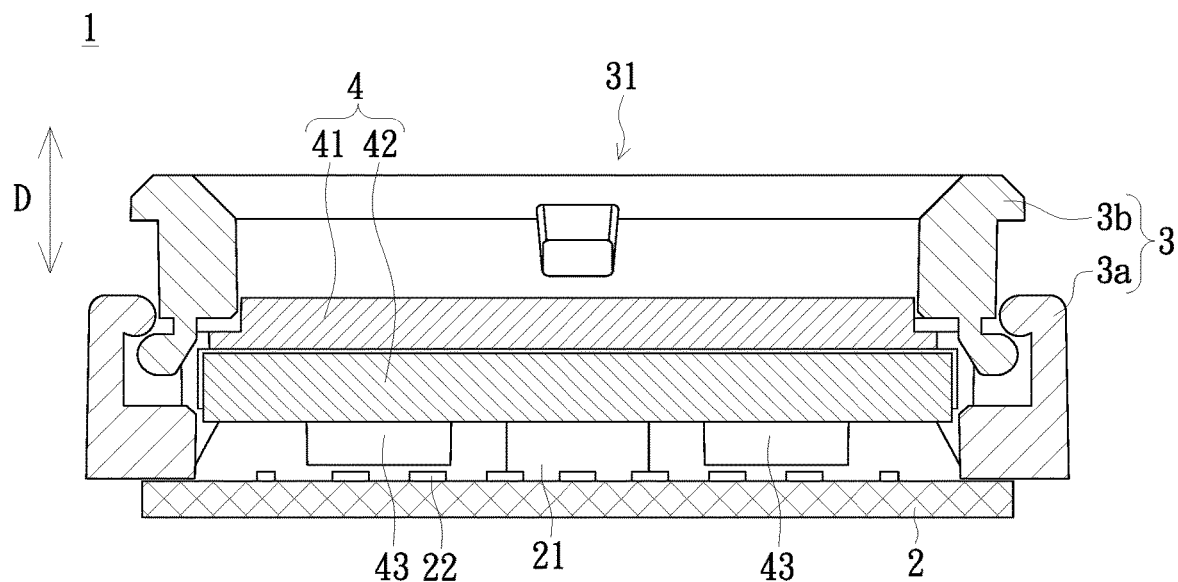
FIG. 3B is a partial schematic cross-sectional view of an actuated physical key in FIG. 1.
Figure 4:
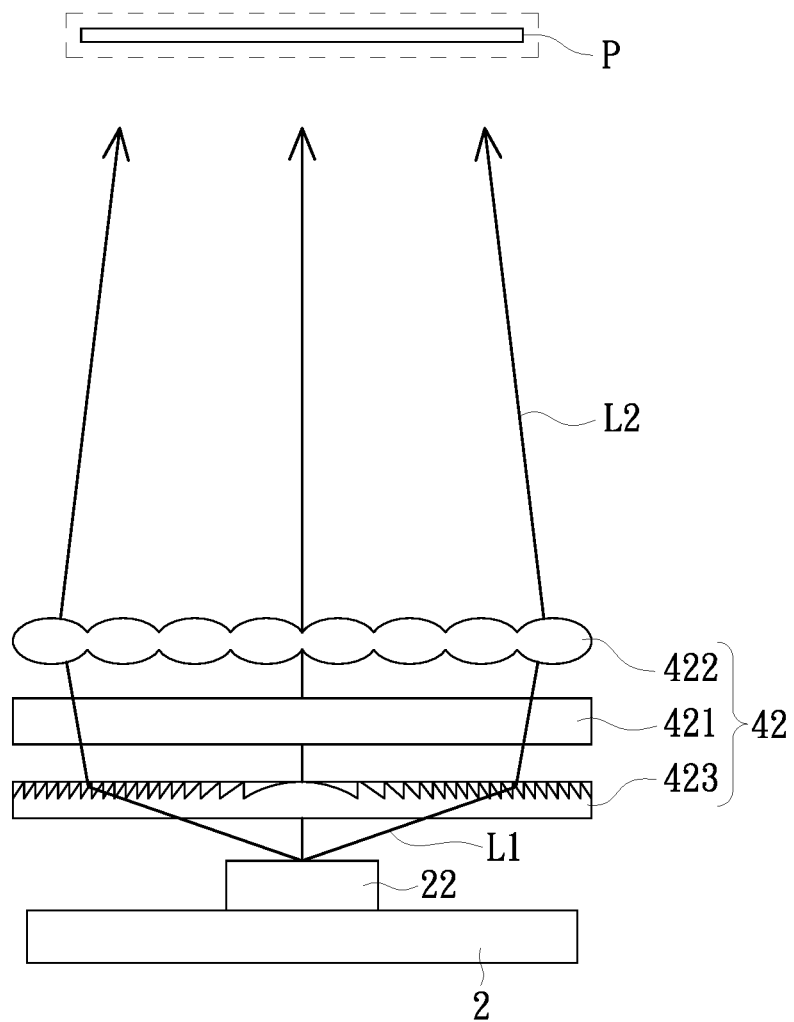
FIG. 4 is an actuating schematic diagram of the optical pressure board assembly generating a three-dimensional optical image in FIG. 1.
Figure 5:
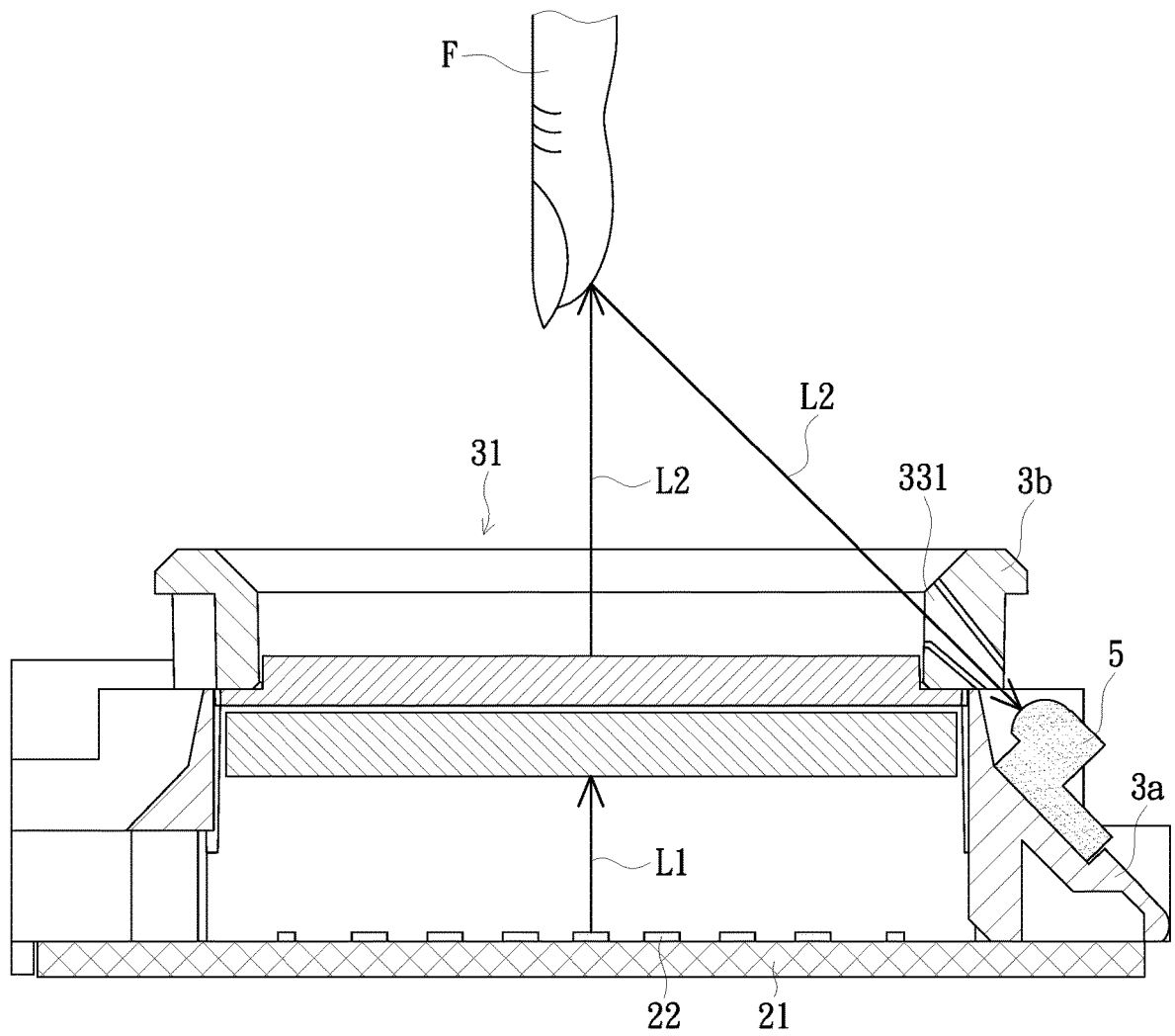
FIG. 5 is a schematic diagram of an actuated optical trigger switch in FIG. 1.

FIG. 1 is an exploded schematic diagram of a button in an embodiment of the present invention. FIG. 2 is a three-dimensional schematic diagram of an optical pressure board assembly in FIG. 1. FIG. 3A is a partial schematic cross-sectional view of an unactuated physical key in FIG. 1. FIG. 3B is a partial schematic cross-sectional view of an actuated physical key in FIG. 1. FIG. 4 is an actuating schematic diagram of the optical pressure board assembly generating a three-dimensional optical image in FIG. 1. FIG. 5 is a schematic diagram of an actuated optical trigger switch in FIG. 1.

As shown in FIG. 1 and FIG. 2, the button 1 in the embodiment includes a substrate 2, a frame body 3, an optical pressure board assembly 4 and an optical trigger switch 5. The substrate 2 includes a physical key 21 and a light emitting assembly 22. The frame body 3 is mounted on the substrate 2 and accommodates the physical key 21 and the light emitting assembly 22, wherein a side of the frame body 3 away from the substrate 2 includes an opening 31. The optical pressure board assembly 4 is slidably arranged in the frame body 3 and covers the physical key 21 and the light emitting assembly 22. The optical pressure board assembly 4 is adapted to moving along an operating direction D towards the substrate 2 from the opening 31 to contact the physical key 21, so that the physical key 21 generates a first manipulation signal. The optical pressure board assembly 4 is further adapted to converting a light beam L1 (shown in FIG. 4) provided by the light emitting assembly 22 into a three-dimensional optical image P (shown in FIG. 4) projected from the opening 31. The optical trigger switch 5 is mounted on an outer side of the frame body 3 and is adapted to generating a second manipulation signal while sensing the three-dimensional optical image P.

In the embodiment, the button 1 is, for example, but not limited to the button for operating an elevator. The physical key 21 is, for example, but not limited to a tact switch (also known as tactile switch), and is adapted to providing a user with a mechanical feedback through an elastic force of an assembly inside the tact switch from the other side of the optical pressure board assembly 4 when a finger F (shown in FIG. 5) of the user presses the optical pressure board assembly 4 along the operating direction D in FIG. 3A and FIG. 3B. Moreover, for example, the physical key generates the first manipulation signal when the optical pressure board assembly 4 is pressed at all. The light emitting assembly 22, for example, includes a plurality of light emitting diodes (LED), the type and quantity of which are not limited.

As shown in FIG. 1, in the embodiment, the frame body 3 is, for example, quadrilateral. In other embodiments, the frame body 3 can be in different shapes according to different design demands. The frame body 3, for example, includes a first frame portion 3*a* and a second frame portion 3*b*. The first frame portion 3*a* is adapted to contacting the substrate 2 and accommodating the optical pressure board assembly 4 when the frame body 3 is connected to the substrate 2. The second frame portion 3*b* is sleeved on the first frame portion 3*a* along the operating direction D and is adapted to forming the opening 31. The sectional area of the opening 31 along the operating direction D is smaller than that of the optical pressure board assembly 4 along the operating direction D. Therefore, the optical pressure board assembly 4 can be prevented from being separated from the first frame portion 3*a* as the optical pressure board assembly is clamped and abutted against the second frame portion 3*b*.

For example, a first bulge portion 321*a* and a second bulge portion 321*b* protruding towards the center are arranged on an inner wall surface 32 of the first frame portion 3*a*. The first bulge portion 321*a* and the second bulge portion 321*b* are, for example, respectively arranged on different inner wall surfaces 32 of the first frame portion 3*a*. The first frame portion 3*a* is respectively provided with a first sliding groove 322 and a second sliding groove 323 in the inner wall surface 32 on both sides of the first bulge portion 321*a*, and is not provided with sliding grooves in the inner wall surface 32 on both sides of the second bulge portion 321*b*. The first sliding groove 322 is a groove body passing through of the first frame portion 3*a* along the operating direction D. The second sliding groove 323 is a groove body close to a connection between the frame body 3 and the substrate 2. A closed end is formed at an end of the second sliding groove 323 away from the substrate 2 and the second sliding groove is not communicated to the second frame portion 3*b*.

As shown in FIG. 1 and FIG. 5, in the embodiment, the frame body 3 further includes an arrangement groove 33. The arrangement groove 33 is formed on a side of a periphery of the opening 31 and is formed on the first frame portion 3*a*. A notch 331 of the arrangement groove 33 passes through the second frame portion 3*b* and inclines to the operating direction D so as to face the opening 31. The optical trigger switch 5 is arranged in the arrangement groove 33 (shown in FIG. 5).

As shown in FIG. 1 and FIG. 2, in the embodiment, the optical pressure board assembly 4, for example, includes a pressure board 41 and an optical imaging component 42. The pressure board 41 is adapted to being pressed by the finger F (shown in FIG. 5) of the user and protecting the optical imaging component 42, and enables the light beam L1 (shown in FIG. 4) provided by the light emitting assembly 22 to pass. The optical imaging component 42 is adapted to generating the three-dimensional optical image P.

The pressure board 41, for example, includes a pressed portion 411 and a plate-like portion 412 located below the pressed portion 411. The pressed portion 411 is, for example, square. The plate-like portion 412 is, for example, in a polygonal shape corresponding to the shape of the wall surface on the inner side of the first frame portion 3a. A groove 412a sunken inwards is formed at the center of each side edge of the plate-like portion 412. The position of the groove 412a corresponds to the position of the bump portion 321 in the first frame portion 3a. A periphery of the plate-like portion 412, for example, includes four guide pieces 43 and four combined pieces 44 extending towards the position of the substrate 2 along the operating direction D, and the quantities of the guide pieces and the combined pieces are not limited.

As shown in FIG. 2, the guide pieces 43 are, for example, arranged near four corners of the plate-like portion 412, and the guide pieces 43 are respectively located on two opposite sides of the pressure board 41 in pairs. The combined pieces 44 are, for example, arranged near four corners of the pressure board 41, and the combined pieces 44 are respectively located on two opposite sides of the pressure board 41 in pairs. In other words, as shown in FIG. 2, adjacent guide pieces 43 and combined pieces 44 located on different side edges are respectively located at each corner of the plate-like portion 412.

As shown in FIG. 1 and FIG. 2, in the embodiment, each of the guide pieces 43, for example, includes a sliding plate portion 431 and a bulge portion 432. The sliding plate portion 431 is slidably connected to the inner wall surface 32 of the frame body 3. The bulge portion 432 protrudes out of the surface of the sliding plate portion 431. The optical pressure board assembly 4 is slidably connected to the inner wall surface 32 of the frame body 3 through the guide pieces 43 on the pressure board 41, and the optical pressure board assembly 4 is prevented from being clamped in the pressing process as a result of too small thickness.

The bulge portion 432 on the guide piece 43, for example, includes a first bulge unit 432a and a second bulge unit 432b. The positions of the first bulge unit 432a and the second bulge unit 432b respectively correspond to the first sliding groove 322 and the second sliding groove 323 in the frame body 3. The first bulge unit 432a is formed as a rib extending along the operating direction D, and is placed at one end of the guide piece 43 close to the pressure board 41. The first bulge unit 432a is adapted to helping the optical pressure board assembly 4 to move along the operating direction D in the first sliding groove 322, and prevents the optical pressure board assembly 4 from rotating due to the pressing position of the finger F. The second bulge unit 432b is formed as a protruding point and is placed at one end of the guide piece 43 away from the pressure board 41. The second bulge unit 432b is adapted to helping the optical pressure board assembly 4 to move along the operating direction D in the second sliding groove 323 and preventing the optical pressure board assembly 4 from being separated from the frame body 3 along the operating direction D through the closed end.

As shown in FIG. 2, the combined piece 44 is adapted to connecting the optical imaging component 42 to the pressure board 41, and enables the side of the optical imaging component 42 facing the substrate 2. The combined piece includes an extension portion 441 extending in an extension direction same with that of the guide piece 43 from the edge of the pressure board 41. A triangular bump 442 is formed at the end of the extension portion 441 away from the pressure board 41. An inclined plane of the bump 442, facing one side away from the pressure board 41, is adapted to clamping the optical imaging component 42.

In addition, as shown in FIG. 1 and FIG. 2, in the embodiment, for example, an unfilled corner 45 is formed at one of the four corners of the plate-like portion 412, which is adapted to enabling one corner of the optical imaging component 42 to be not covered with the pressure board 41 when the pressure board 41 is connected to the optical imaging component 42, so that the user separates the optical imaging component 42 from the pressure board 41 in a place where the unfilled corner 45 is located during maintenance.

As shown in FIG. 3A and FIG. 3B, in the embodiment, when the button 1 is not pressed during use, a brake part 21a on the physical key 21 is, for example, protruding from the physical key 21 and pushes against the optical imaging component 42 of the optical pressure board assembly 4. When the button 1 (the pressed portion 411) is pressed by the user, the optical pressure board assembly 4 moves towards the substrate 2 along the operating direction D, and presses the brake part 21a to move toward the inside of the physical key 21. Therefore, the physical key 21 generates the first manipulation signal. When the pressed portion 411 is no longer pressed by the user, the physical key 21 pushes against the optical pressure board assembly 4 through the brake part 21a, so that the optical pressure board assembly 4 moves away from the substrate 2 along the operating direction D and returns to the original position.

As shown in FIG. 4, in the embodiment, the optical imaging component 42, for example, includes an imaging unit 421 and a lens array 422. The imaging unit 421 faces the substrate 2 relative to the lens array 422. The surface of the imaging unit includes a partially translucent preset pattern (not shown in the figure), and is adapted to shielding a part of light beam L1 from the light emitting assembly 22 through a preset pattern so as to decide an image content of the three-dimensional optical image P. The image content of the three-dimensional optical image P is, for example, a pattern such as a figure representing a floor of the elevator or a character representing an instruction. The lens array 422 is, for example, a biconvex lens array and is adapted to forming the three-dimensional image by the passing light beam L1. In other embodiments, the lens array can also be a plano-convex lens array and can be arranged as needed. When the light beam L1 generated by the light emitting assembly 22 is incident on the optical pressure board assembly 4, the light beam L1 will pass through the imaging unit 421 and the lens array 422 in sequence. In other words, the optical imaging component 42 shields a part of light beam L1 first through the preset pattern and then enables the unshielded light beam L1 to form the three-dimensional optical image P through the lens array 422.

As shown in FIG. 4, in the embodiment, the optical pressure board assembly 4, for example, further includes a collimating unit 423. The collimating unit 423 is configured between the substrate 2 and the aforementioned imaging unit 421 and the lens array 422, so that the imaging unit 421 is placed between the lens array 422 and the collimating unit 423. The collimating unit 423 is adapted to converting the light beam L1 into a parallel light beam L1, so as to improve the brightness of the three-dimensional optical image P. The collimating unit 423 is, for example, the Fresnel lens, which is not limited.

As shown in FIG. 5, the optical trigger switch 5 assembled in the arrangement groove 33 performs induction towards the front side of the opening 31 along the operating direction D. When the light beam L1 generated by the light emitting assembly 22 passes through the optical pressure board assembly 4 and is converted into a light beam L2, the light beam will form the three-dimensional optical image P in front of the opening 31 along the operating direction D. At this time, since the imaging direction of the three-dimensional optical image P is different from the arranging direction of the opening 31, there will be no light entering the opening 31 to trigger the optical trigger switch 5. When the finger F of the user approaches to the three-dimensional optical image P, a part of the light beam L2 of the three-dimensional optical image P will be reflected and is projected to the optical trigger switch 5 due to the finger F of the user. When the optical trigger switch 5 senses the reflected light, the second manipulation signal will be generated. It can be known from above that in the present invention, in addition to serving as a light source of the light beam L1 for generating the three-dimensional optical image P, the light emitting assembly 22 can further serve as a light source of the light beam L2 sensed by the optical trigger switch 5.

Figure 6:
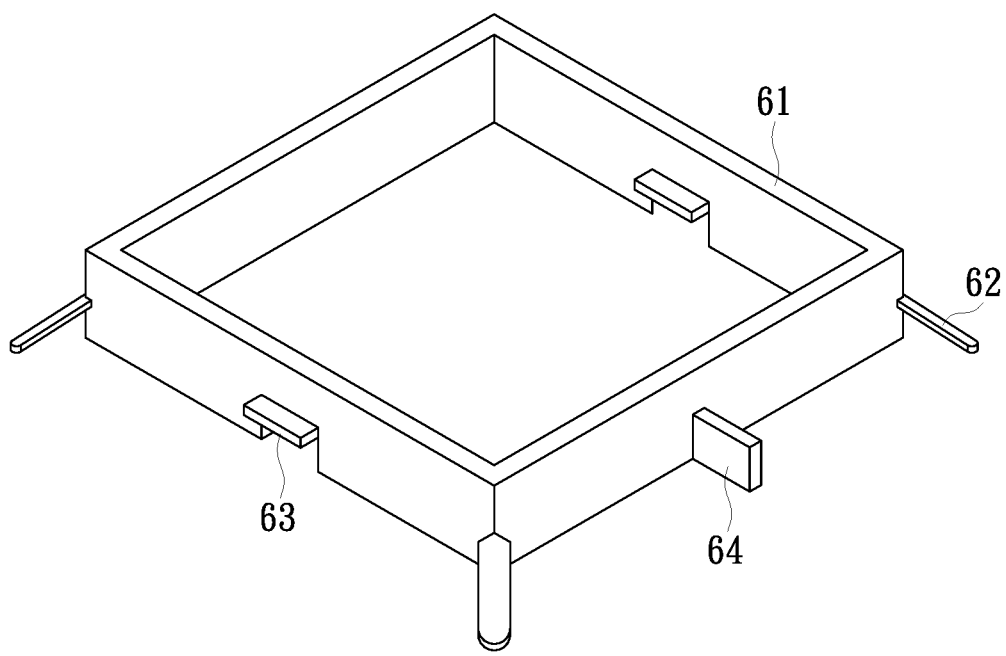
FIG. 6 is a schematic diagram of a middle frame of the button in another embodiment of the present invention.
Figure 7A:
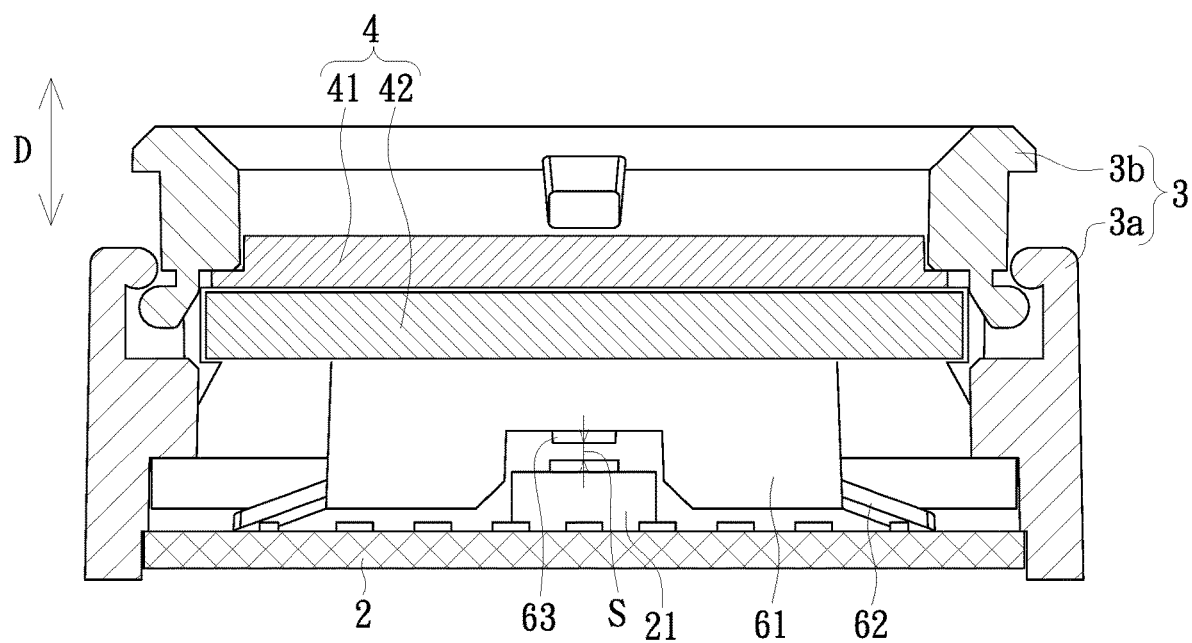
FIG. 7A and FIG. 7B are partial schematic cross-sectional views of the actuated physical key in FIG. 6.
Figure 7B:
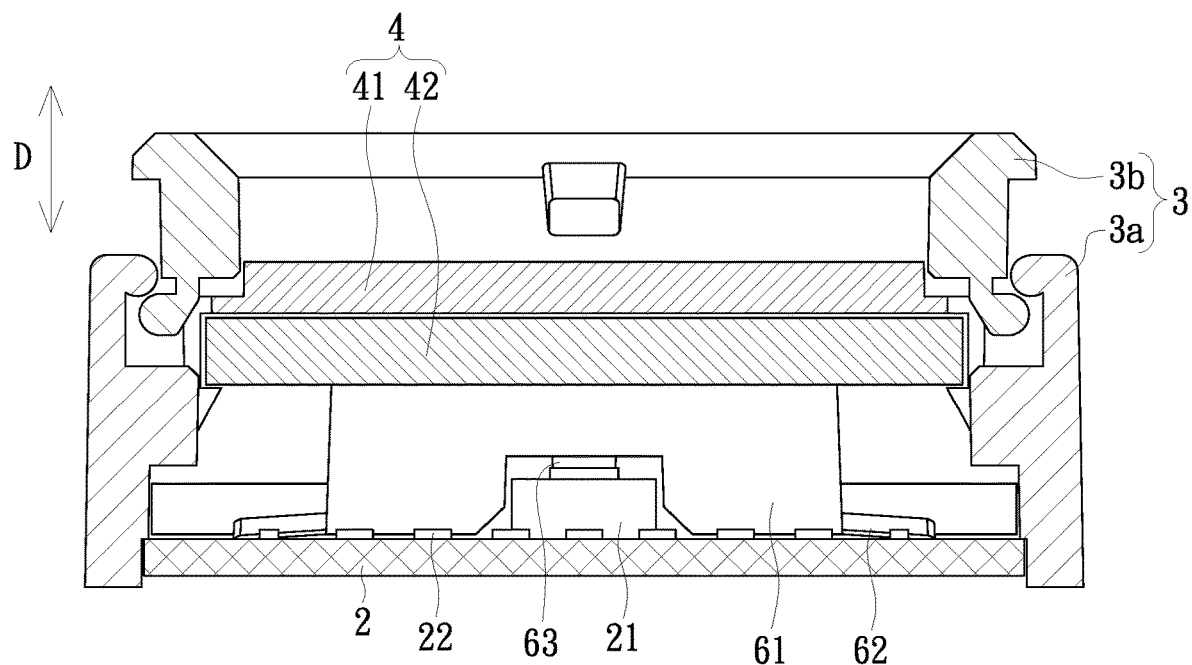

FIG. 6 is a schematic diagram of a middle frame of the button in another embodiment of the present invention. FIG. 7A and FIG. 7B are partial schematic cross-sectional views of the actuated physical key in FIG. 6. As shown in FIG. 6 to FIG. 7B, in another embodiment of the present invention, the button 1 further includes a middle frame 6, wherein the middle frame 6 is located in the frame body 3 and between the optical imaging component 42 and the substrate 2. The middle frame 6 is adapted to pushing against the optical imaging component 42 along the operating direction D so as to provide a counter-acting force for resisting the force of the finger F of the user. The middle frame 6 is further adapted to contacting the physical key 21 after being pushed against the optical imaging component 42.

In the embodiment, the middle frame 6 is, for example, in a quadrilateral shape corresponding to the shape of the frame body 3, and includes a body 61 and four elastic arms 62 connected to the body 61. One side of the body 61 is adapted to contacting the optical imaging component 42, and the other opposite side of the body is adapted to contacting the physical key 21 after being pushed against the optical imaging component 42. In the embodiment, the body 61 is, for example, provided with a pressing block 63 in a position corresponding to the physical key 21. A sliding block 64 slidably arranged in a third sliding groove 324 is arranged in a position corresponding to the third sliding groove 324 (shown in FIG. 1) on the second bulge portion 321b of the first frame portion 3a to prevent the middle frame 6 from rotating.

Each of the elastic arms 62 extends obliquely towards the substrate 2 along the operating direction D from the body 61 and contacts and pushes against the substrate 2. The elastic arm 62 is adapted to generating a gap S between the body 61 and the substrate 2 when the body 61 is not pushed. The quantity of the elastic arms 62 and the positions thereof on the body 61 are not limited, and the elastic arms can be arranged as needed.

As shown in FIG. 7A and FIG. 7B, when the optical pressure board assembly 4 is pressed by the finger F (not shown in the figures) of the user, the middle frame 6 pressed by the optical pressure board assembly 4 moves towards the substrate 2 to press the physical key 21 through the pressing block 63, which enables the elastic arm 62 to deform. When the finger F of the user is separated from the optical pressure board assembly 4, the elastic arm 62 will return to the original shape and enables the middle frame 6 to move away from the substrate 2. The optical pressure board assembly 4 pushed by the middle frame 6 will return to the original position.

By virtue of the above description, since the optical trigger switch, the physical key and the movable optical pressure board assembly are arranged in the button, the button can also be used to generate manipulation signals by way of pressing the physical key by the optical pressure board assembly while the button is used as the non-physical key capable of generating the three-dimensional optical image through the optical trigger switch and the optical pressure board assembly. Therefore, when the optical trigger switch declines in function, fails or is abnormal, the button can also be used as the contact button.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A button, comprising:
   a substrate, comprising a physical key and a light emitting assembly;
   a frame body, mounted on the substrate and accommodating the physical key and the light emitting assembly, wherein a side of the frame body away from the substrate includes an opening;
   an optical pressure board assembly, slidably arranged in the frame body and covering the physical key and the light emitting assembly, wherein the optical pressure board assembly is adapted to moving in an operating direction towards the substrate from the opening to contact the physical key, so that the physical key generates a first manipulation signal, and the optical pressure board assembly is further adapted to converting a light beam provided by the light emitting assembly into a three-dimensional optical image projected from the opening; and
   an optical trigger switch, mounted on an outer side of the frame body and adapted to generating a second manipulation signal while sensing the three-dimensional optical image.

2. The button according to claim 1, wherein the optical pressure board assembly comprises:
   a pressure board, wherein a periphery of the pressure board comprises at least one guide piece; the guide piece comprises a sliding plate portion and a bulge portion, the sliding plate portion is slidably connected to an inner wall surface of the frame body, and the bulge portion protrudes out of a surface of the sliding plate portion and is adapted to being slidably arranged in a sliding groove in the inner wall surface; and
   an optical imaging component, connected to the pressure board and located on a side of the pressure board facing the substrate.

3. The button according to claim 2, wherein the optical imaging component comprises:
   an imaging unit, facing the substrate and comprising a preset pattern; and
   a lens array, configured on a side of the imaging unit away from the substrate, wherein the light beam passes through the imaging unit and the lens array to form the three-dimensional optical image.

4. The button according to claim 3, wherein the optical imaging component further comprises a collimating unit, configured between the substrate and the imaging unit and adapted to converting the light beam into a parallel light beam.

5. The button according to claim 1, further comprising a middle frame, the middle frame being connected between the optical imaging component and the substrate and comprising a body and an elastic arm connected to the body, wherein the body is adapted to contacting the physical key after being pushed against, and the elastic arm is connected to the substrate and is adapted to generating a gap between the body and the substrate.

6. The button according to claim 1, wherein the physical key is a tactile switch, adapted to providing the optical pressure board assembly with a restoring acting force when the optical pressure board assembly is pressed.

7. The button according to claim 1, wherein the frame body comprises an arrangement groove, the arrangement groove is formed in a side of the opening, a notch of the arrangement groove inclines to the operating direction and faces the opening, and the optical trigger switch is arranged in the arrangement groove.

* * * * *